(12) United States Patent
Huang et al.

(10) Patent No.: US 8,458,205 B2
(45) Date of Patent: Jun. 4, 2013

(54) IDENTIFYING A GROUP OF PRODUCTS RELEVANT TO DATA PROVIDED BY A USER

(75) Inventors: Chin-Yung Huang, Foster City, CA (US); Jim Rhyne, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/627,492

(22) Filed: Nov. 30, 2009

(65) Prior Publication Data

US 2011/0131245 A1 Jun. 2, 2011

(51) Int. Cl.
*G06F 17/30* (2006.01)
*G06F 7/00* (2006.01)

(52) U.S. Cl.
USPC .......................................... 707/758; 707/803

(58) Field of Classification Search
USPC .................................................. 707/758, 803
See application file for complete search history.

(56) References Cited

U.S. PATENT DOCUMENTS

| | | | |
|---|---|---|---|
| 6,965,887 B2 * | 11/2005 | Huelsman et al. | 706/47 |
| 7,567,947 B2 * | 7/2009 | Balog | 706/47 |
| 7,805,417 B2 * | 9/2010 | Noble et al. | 707/694 |
| 7,945,691 B2 * | 5/2011 | Dharamshi | 709/232 |
| 2005/0246685 A1 * | 11/2005 | Braddock, Jr. | 717/116 |
| 2005/0246686 A1 * | 11/2005 | Seshadri et al. | 717/117 |
| 2008/0243677 A1 | 10/2008 | Hogg et al. | |
| 2009/0132458 A1 * | 5/2009 | Edwards et al. | 706/50 |
| 2009/0265300 A1 * | 10/2009 | Balog | 706/60 |

OTHER PUBLICATIONS

Cowell-Shah et al.: Oracle® Fusion Middleware User's Guide for Oracle Business Rules 11g Release 1 (11.1.1) E10228-01, May 2009.*

* cited by examiner

*Primary Examiner* — Kuen Lu
(74) *Attorney, Agent, or Firm* — Steven L. Nichols; Van Cott, Bagley, Cornwall & McCarthy P.C.

(57) ABSTRACT

A method for using a rule-based system implemented by at least one physical processor to identify from a set of available products a group of products relevant to data provided by a user includes creating with the rule-based system a number of rules based on the data provided by the user, for each available product in the set of available products, creating a combined ruleset including the rules based on the data provided by the user and a number of rules characterizing the available product and determining with the rule-based system whether a conflict exists in the combined ruleset, and returning to the user the available products for which no conflict was found as the group of products relevant to the data provided by the user.

21 Claims, 8 Drawing Sheets

IDENTIFYING A GROUP OF PRODUCTS RELEVANT TO DATA PROVIDED BY A USER

BACKGROUND

Aspects of the present invention relate in general to rule-based systems and more particularly, to identifying a group of products relevant to data provided by a user through rule-based systems.

Many businesses offer a wide range of products. Different products may be suitable for different customers due to the variance in customer needs. Furthermore, for some types of products, such as financial products, customers may be required to meet certain qualification requirements in order to purchase a product. Thus, for a business that offers a great variety of products with different features and qualification requirements, it is often prudent to first determine which of the products are applicable to the needs and qualifications of a particular customer, and then allow the customer to browse among the reduced set of applicable products. This sorting of products is often accomplished using specialized software. However, for businesses providing products which change rapidly in response to external factors (e.g., market conditions), it may be difficult to maintain software to help manage the sale of their products.

The use of rule-based systems by businesses to manage product portfolios has steadily increased in recent years. Rule-based systems may be used to store data and manipulate that data to obtain desired information based on a list of rules and facts, as opposed to standard programming languages in which a sequence of instructions is executed. Logical inferences may then be made from those facts and rules. Rule-based systems generally make use of a logical reasoner function which is responsible for making the logical inferences. A logical reasoner may also detect conflicts within a set of facts and rules.

BRIEF SUMMARY

A method for using a rule-based system implemented by at least one physical processor to identify from a set of available products a group of products relevant to data provided by a user includes creating with the rule-based system a number of rules based on the data provided by the user, for each available product in the set of available products, creating a combined ruleset including the rules based on the data provided by the user and a number of rules characterizing the available product, and determining with the rule-based system whether a conflict exists in the combined ruleset, and returning to the user the available products for which no conflict was found as the group of products relevant to the data provided by the user.

A computing system including a processor and a memory communicatively coupled to the processor, the memory having stored thereon executable code configured to implement a rule-based logical reasoner when the executable code is executed by the processor. The processor is configured to create a number of rules based on the data provided by the user, for each available product in the set of available products, create a combined ruleset including the rules based on the data provided by the user and a number of rules characterizing the available product and determine with the rule-based logical reasoner whether a conflict exists in the combined ruleset, and return to the user the available products for which no conflict was found as the group of products relevant to the data provided by the user.

A computer program product for determining an appropriate product for a customer, the computer program product includes a computer readable storage medium having computer readable code embodied therewith, the computer readable program code including computer readable program code configured to create a number of rules based on the data provided by the user, for each available product in the set of available products, computer readable program code configured to create a combined ruleset including the rules based on the data provided by the user and a number of rules characterizing the available product and computer readable program code configured to determine whether a conflict exists in the combined ruleset, and computer readable program code configured to return to the user the available products for which no conflict was found as the group of products relevant to the data provided by the user.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification relates to a method and system for determining appropriate products for a customer by using a rule-based system to match product specifications with customer needs and qualifications. According to certain illustrative embodiments, a computing system may be configured to translate the terms and conditions of a number of products into product rules which are in a format which is readable by a logical reasoner. Likewise, customer requests and qualifications may also be translated into customer rules in a format readable by the logical reasoner. The rules for each product may be processed with the customer rules as a combined ruleset by the logical reasoner. The computing system may then present to a user any products in which a conflict was not found in the union of the product rules and customer rules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "rule" refers to a logical statement which is assumed to be true. The rule may represent data about a product, requests by a customer, or external conditions.

Throughout this specification and in the appended claims, the term "logical reasoner" is to be broadly interpreted as a system or function which may process rules and make logical inferences therefrom. A logical reasoner may also determine if there is a conflict within a given set of rules.

Figure 1:
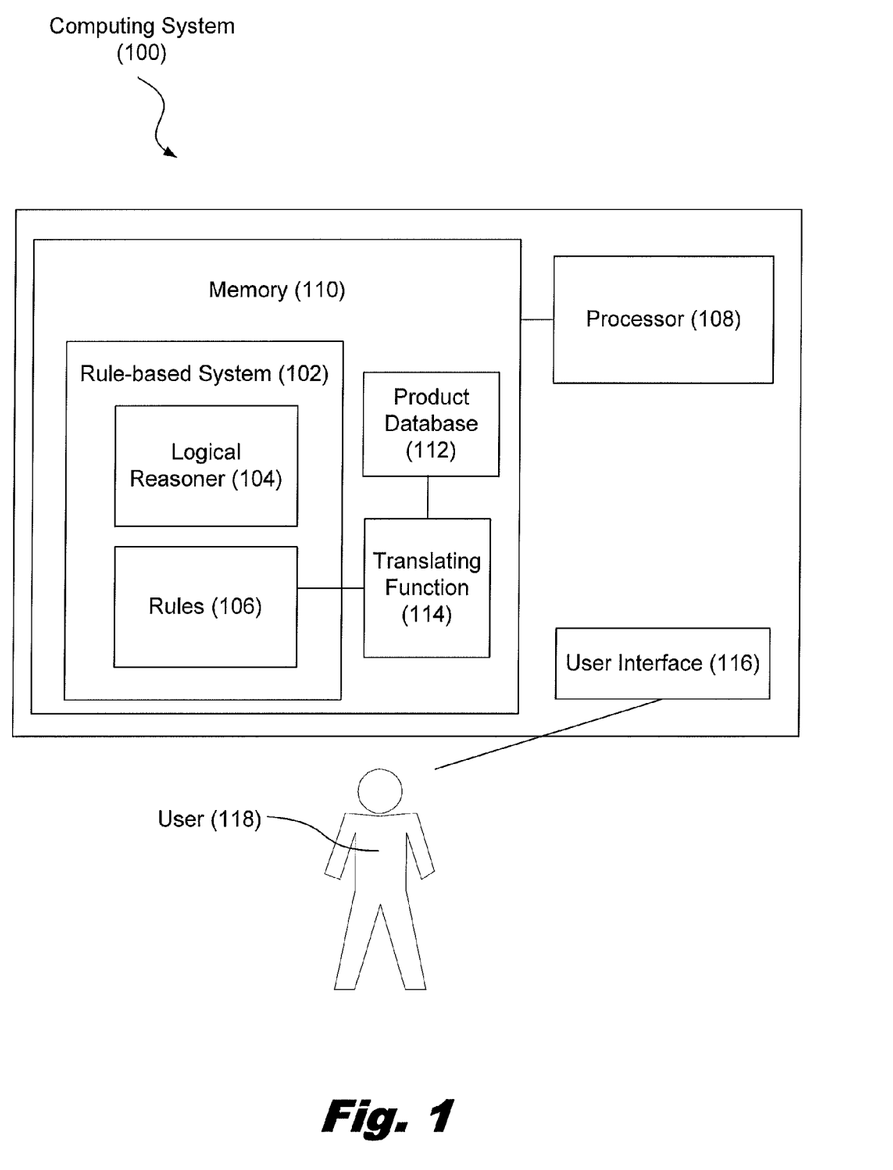
FIG. 1 is a diagram showing an illustrative computing system, according to one embodiment of principles described herein.

Referring now to the figures, FIG. 1 is a diagram showing an illustrative computing system (100). According to certain embodiments, a computing system (100) may include a processor (108), a memory (110), and a user interface (116). The processor may be configured to execute computer readable program code stored on the memory (110) to implement a rule-based system (102) including a logical reasoner (104) and a set of rules (106). The processor (108) and memory (110) may further implement a product database (112), and a translating function (114)

The computing system (100) may be embodied as any physical computing device or combination of physical computing devices that may suit the particular application of the principles described herein. For example, a computing device may be a laptop computer, a desktop computer, a server, or a Personal Digital Assistant (PDA). The memory (110) used by the computing system (100) may include, but is not limited to, a magnetic disk drive, a solid state drive, volatile solid-state memory, and/or an optical disc drive.

As mentioned above, a rule-based system (102) provides a means to store and interpret data. A rule-based system may be configured to work with a set of rules (106). The rules (106) may include a number of axioms and conditional statements. The rule-based system (102) may employ the logical reasoner (104) to make logical inferences from a given set of axioms according to the defined set of rules.

A logical reasoner (104) is a software entity often configured to use first-order logic. In certain embodiments, a rule-based system (100) may employ a logical reasoner (104) which uses description logic. Description logic is a knowledge based language which is used to describe logical statements in a clear and consistent manner.

The product database (112) may be used to store product data in an organized manner. Many businesses offer a large number of different types or products. The product database (112) may be searched using standard query languages such as Structured Query Language (SQL).

The translating function (114) may be used by the computing system to translate product data into a set of axioms and rules in a format able to be processed by the logical reasoner (104).

The user interface (116) may enable interaction between the computing system (100) and a user (118). The user interface (116) may include a display device as well as an input receiving device such as a keyboard or a mouse. Through the user interface (116), a user (118) is able to send commands to the computing system (100).

Figure 2:
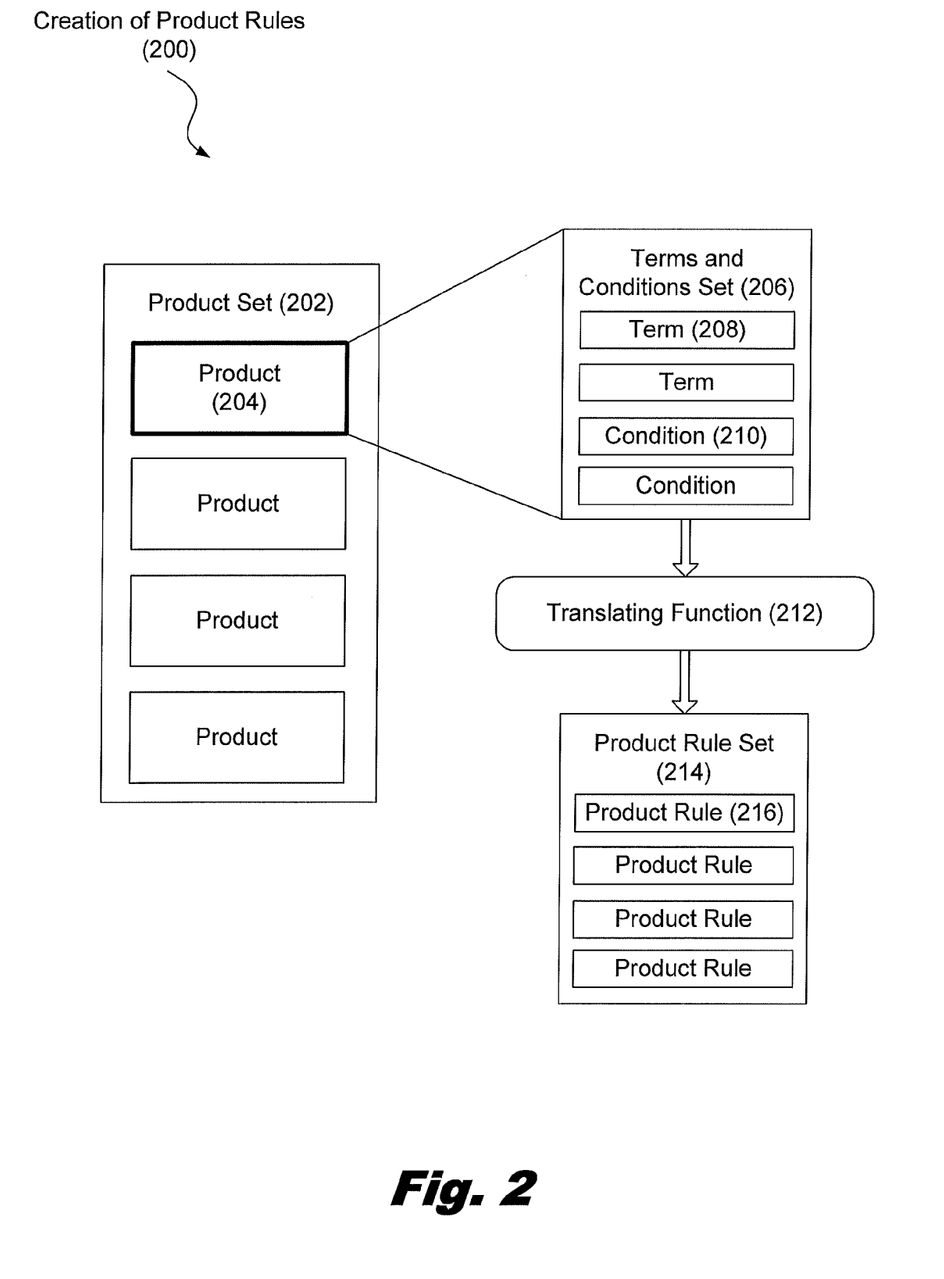
FIG. 2 is a diagram showing an illustrative process for the creation of product rules, according to one embodiment of principles described herein.

FIG. 2 is a diagram showing an illustrative process for the creation of product rules (200). According to certain illustrative embodiments, the process for creating product rules may include a product set (202) containing a number of products (204), a terms and conditions set (206) including a number of terms (208) and conditions (210), a translating function (212), and a product rule set (214) including a number of product rules (216).

As mentioned above, businesses often provide a product set (202) including a wide range of products (204). For example, a financial institution may offer several types of products including, but not limited to, loans, deposit accounts, and brokerage products. Each product (204) may have terms and conditions set (206) associated therewith. For example, the terms (208) of a loan product may specify the interest rate, loan value, and loan period. The conditions (210) associated with a loan product may specify various requirements a customer receiving the loan must follow.

As mentioned above, a translating function (212) is used by the computing system to translate terms and conditions associated with the various products into a product ruleset (214) including a number of product rules (216) and axioms. The product rules (216) may be translated into a format that is able to be processed by a rule-based system.

Figure 3:
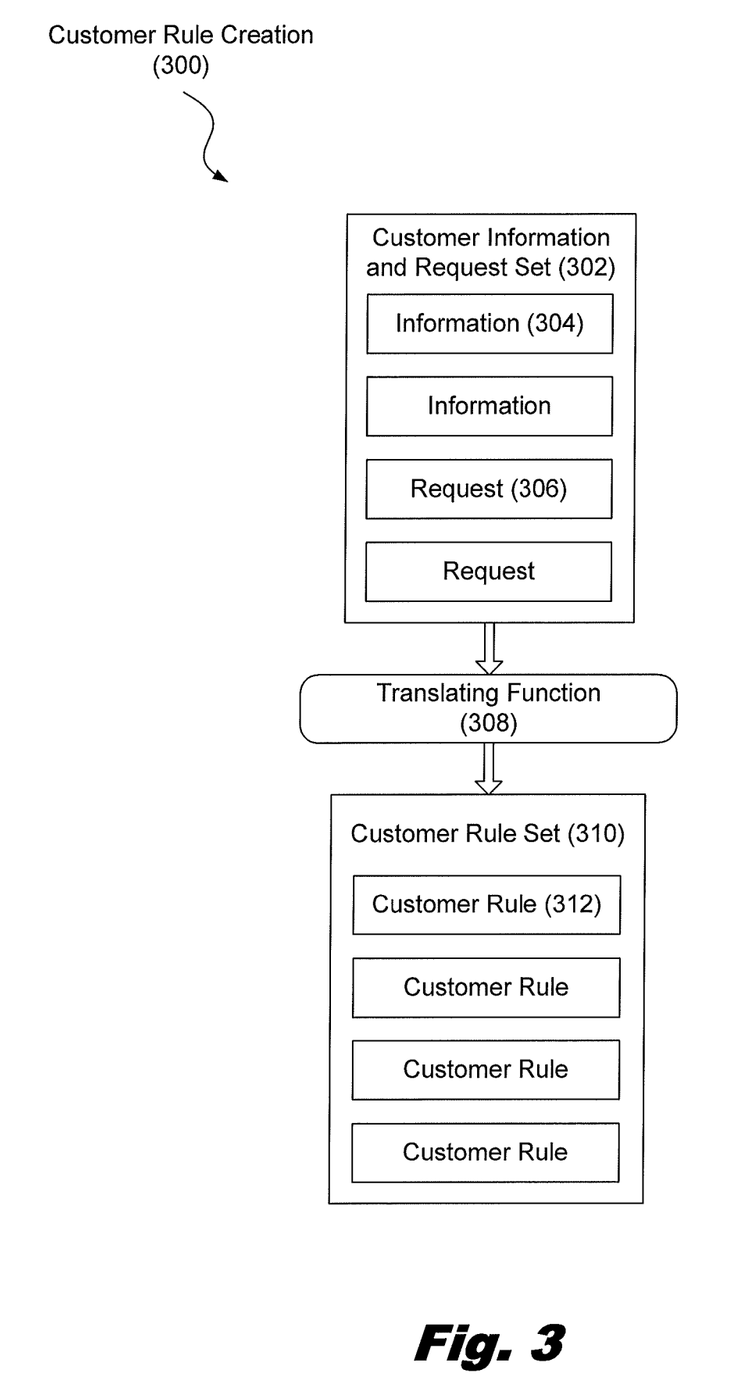
FIG. 3 is a diagram showing an illustrative process for the creation of customer rules, according to one embodiment of principles described herein.

FIG. 3 is a diagram showing an illustrative process (300) for the creation of customer rules. According to certain illustrative embodiments, the process (300) for creating customer rules may involve a customer information request set (302) including information (304) and requests (306), a translating function (308), and a customer rule set (310) including a number of customer rules (312).

Customers are often looking for specific products. For example, if a customer is looking for a loan, they may specify to a financial institution that they have a request (306) for a fixed rate loan with a specified maximum interest rate. A customer may have further requests (306) such as term length and loan value.

Many products which are offered by businesses come with certain requirements. For example, a loan with a certain interest rate may require that a customer have a credit score within a specified range. Additionally or alternatively, a loan product may require that the customer be within a specified age range. Thus, information about a customer may be important for a rule-based system to know when searching for a list of products applicable to the customer.

The translating function (308) may be configured to translate the customer information (304) and customer requests (306) into a customer ruleset (310). The customer ruleset (310) may include a number of customer rules (312) in a format able to be processed by a rule-based system.

Figure 4:
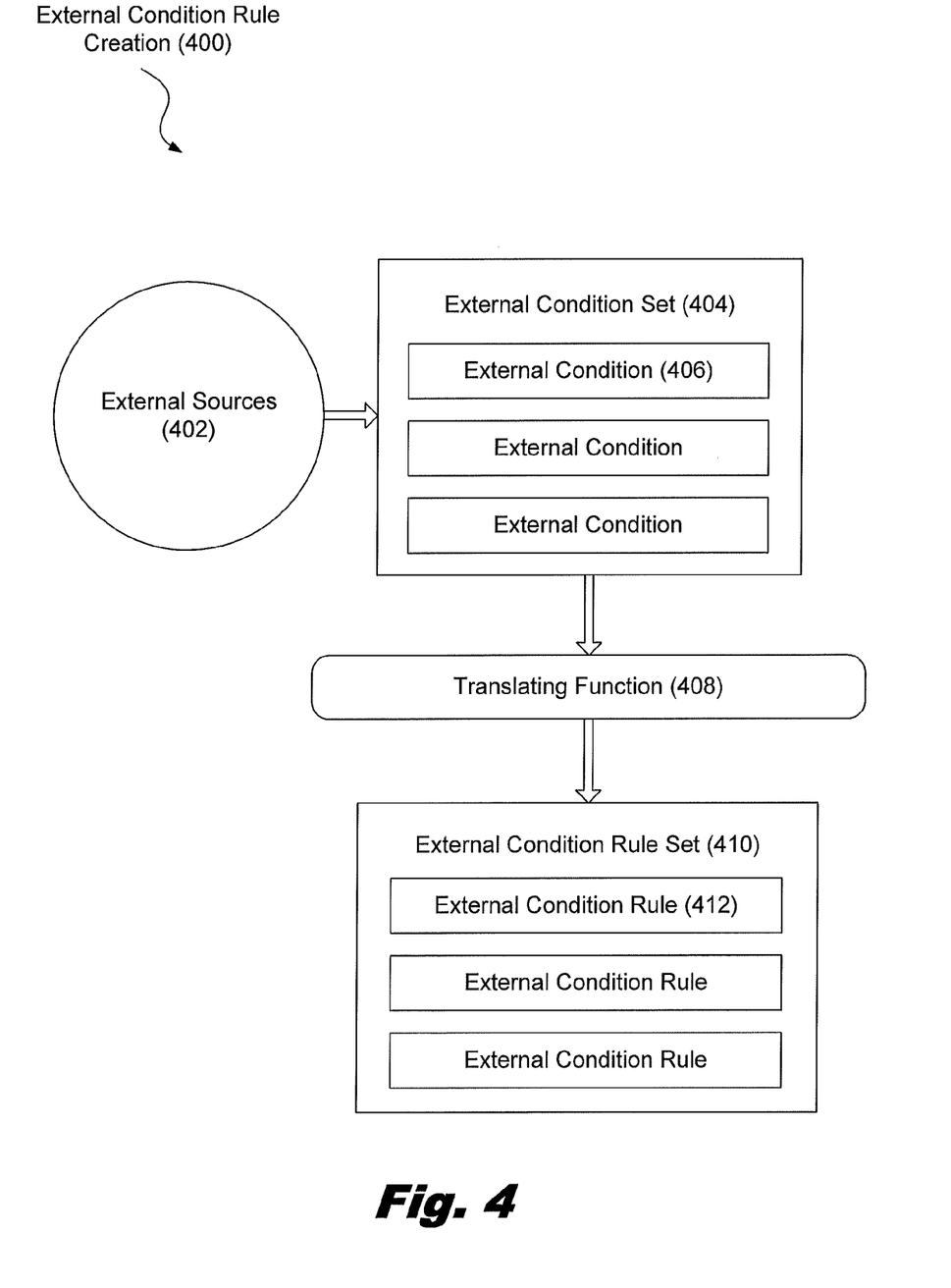
FIG. 4 is a diagram showing an illustrative process for the creation of external condition rules according to one embodiment of principles described herein.

FIG. 4 is a diagram showing an illustrative process (400) for the creation of external condition rules. According to certain embodiments, the process (400) for creating external condition rules may involve external sources (402), an external condition set (404) including a number of external conditions (406), a translating function (408), and an external condition rule set (410) including a number of external condition rules (412).

Many products offered by businesses depend on external conditions (406) such as various market indices. For example, a loan product may have an interest rate that depends on the current prime rate. Additionally, various brokerage products depend on various stock market indices. A computing system may be configured to retrieve an external condition set (404) from an external source (402). These external sources (402) may be available over a computer network such as the Internet.

The translating function (408) may be configured to translate the external conditions (406) into an external condition ruleset (410). The external condition ruleset (410) may include a number of external condition rules (412) which are in a format able to be processed by a rule-based system.

Figure 5:
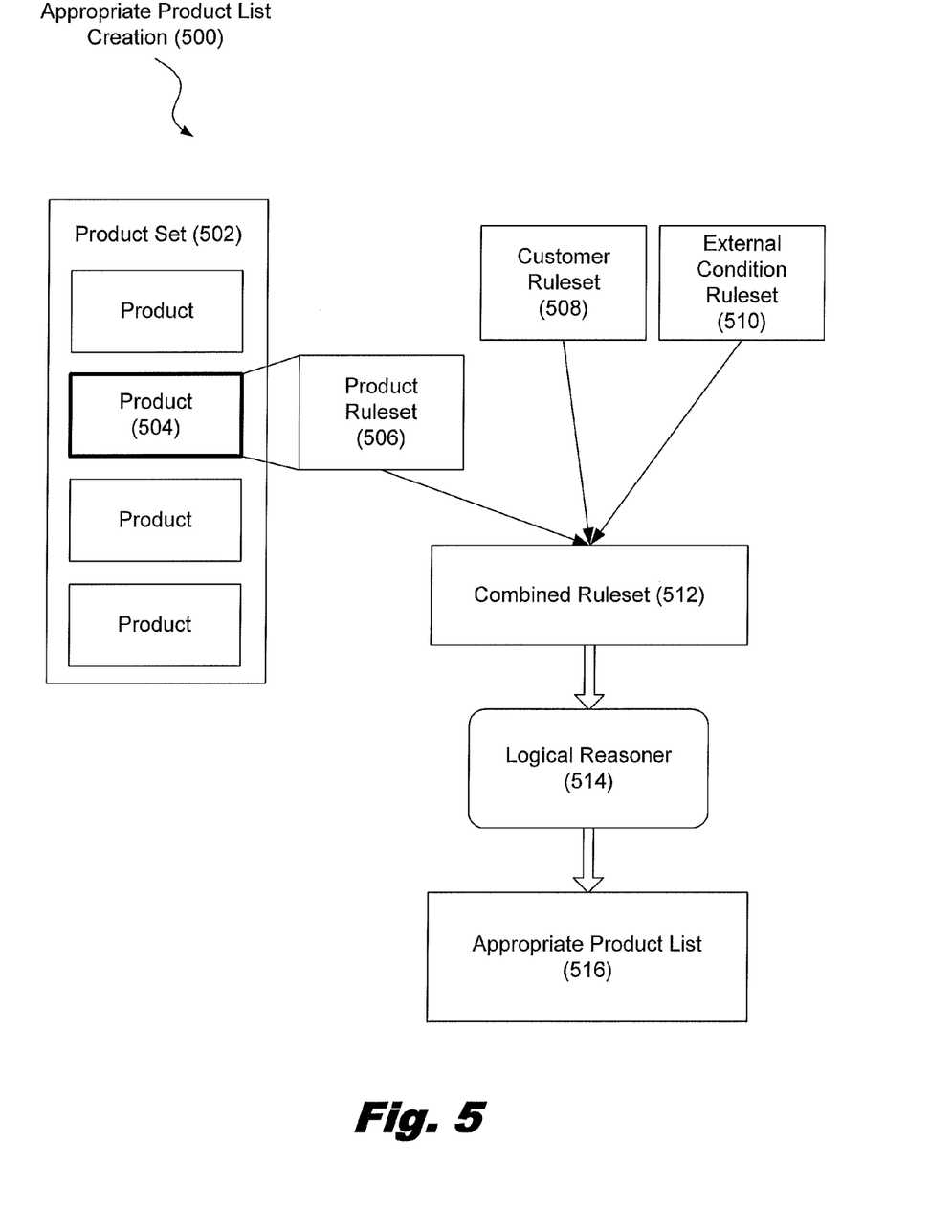
FIG. 5 is a diagram showing an illustrative process for the creation of a list of appropriate products for a user, according to one embodiment of principles described herein.

FIG. 5 is a diagram showing an illustrative process for the creation of a list of appropriate products for a user. According to certain embodiments, the process for creating a list of appropriate products for a customer may include a product set (502) including a number of products (504), each product having associated therewith a product ruleset (506). The process may further include a union (512) of a product ruleset (506), a customer ruleset (508), and an external condition ruleset (510). Additionally, the process may include a logical reasoner (514) and an appropriate product list (516).

According to certain embodiments, a rule-based system may be configured to cycle through each product (504) in a product set (502) and form a combined ruleset (512) including the product ruleset (506) for the current product, the customer ruleset (508) and an external condition ruleset (510). The combined ruleset (512) may then be processed by the logical reasoner (514).

As mentioned above, the logical reasoner is used to make logical inferences from a given set of rules and axioms. Additionally, a logical reasoner may indicate that there is a conflict in a combined ruleset (512). For example, if the product ruleset indicates that a loan has an interest rate of 8% and the customer ruleset indicates that the customer wants a loan with an interest rate less than 7%, then the combined ruleset will cause a conflict in the logical reasoner. If a conflict is found, than the product having its product ruleset with a customer ruleset is not a suitable product for the customer.

After the rule-based system has iterated through each product (504), an appropriate product list (516) may be created. The appropriate product list (516) may be a list of each product in which a conflict was not found. The appropriate product list (516) may then be presented to a user.

Figure 6:
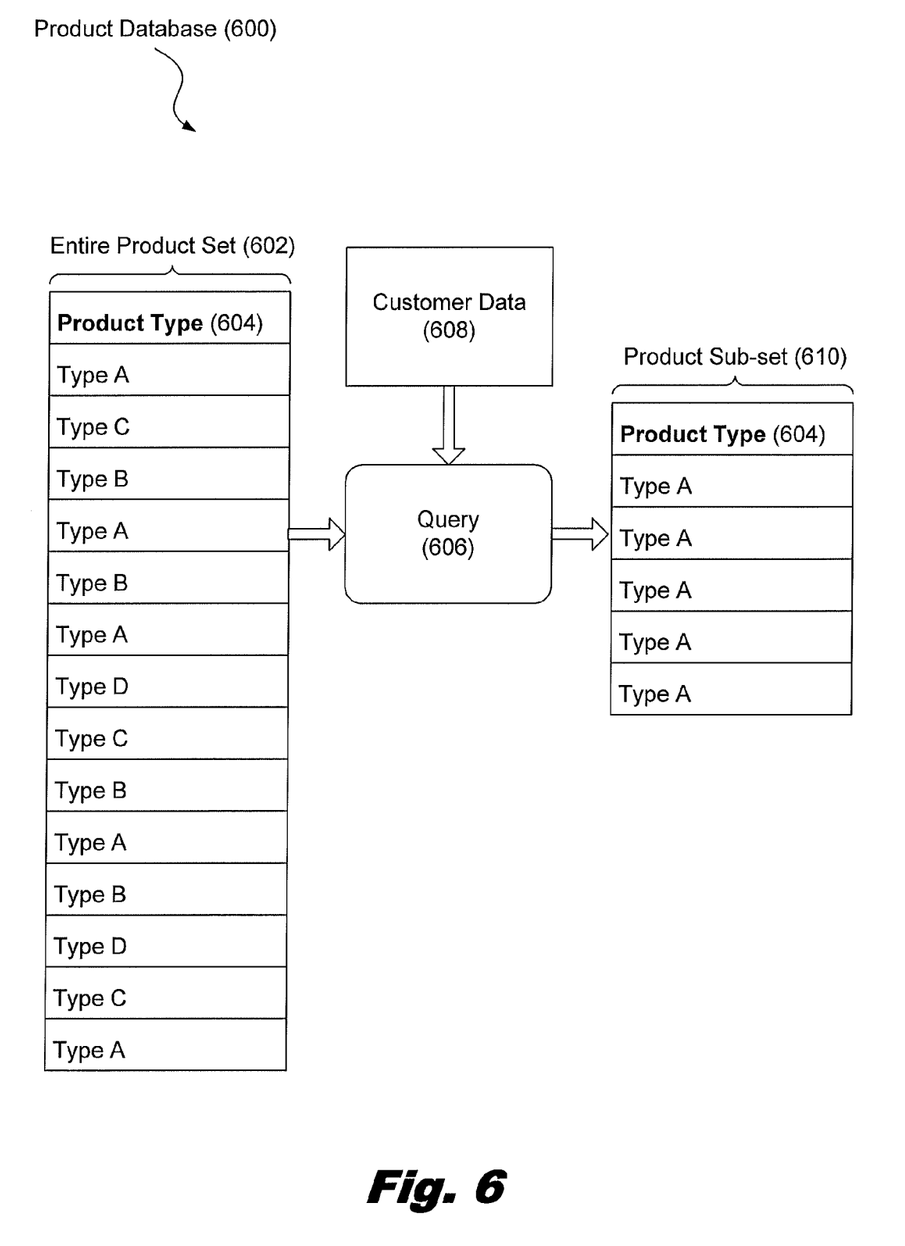
FIG. 6 is a diagram showing an illustrative product database which may be searched with a query language to provide a subset of products from which to search for appropriate products, according to one embodiment of principles described herein.

FIG. 6 is a diagram showing an illustrative product database (600) which may be searched with a query language to provide a subset (610) of products from which to search for appropriate products for a customer. According to certain illustrative embodiments, an entire product set (602) may be searched using a query (606) derived from customer data (608). The query (606) which is based on a product type (604) may produce a product subset (610).

Many businesses offer a wide range of products. Thus a database (600) may store information associated with a very large number of products. As a result, more processing resources may be required to form a combined ruleset with each product. According to certain illustrative embodiments, a rule-based system may be configured to use a database query on an entire product set (602). The query (606) may be based off of customer data (608) provided by the customer. For example, if a customer is looking for a product of type A, then the query (606) may create a product subset (610) containing only products of type A.

After the product subset (610) has been created, the product ruleset associated with each product within the product subset (610) may then be combined with a customer ruleset and processed by a logical reasoner. Again, a list of all the products for which a conflict is not found may be presented to a user.

Figure 7:
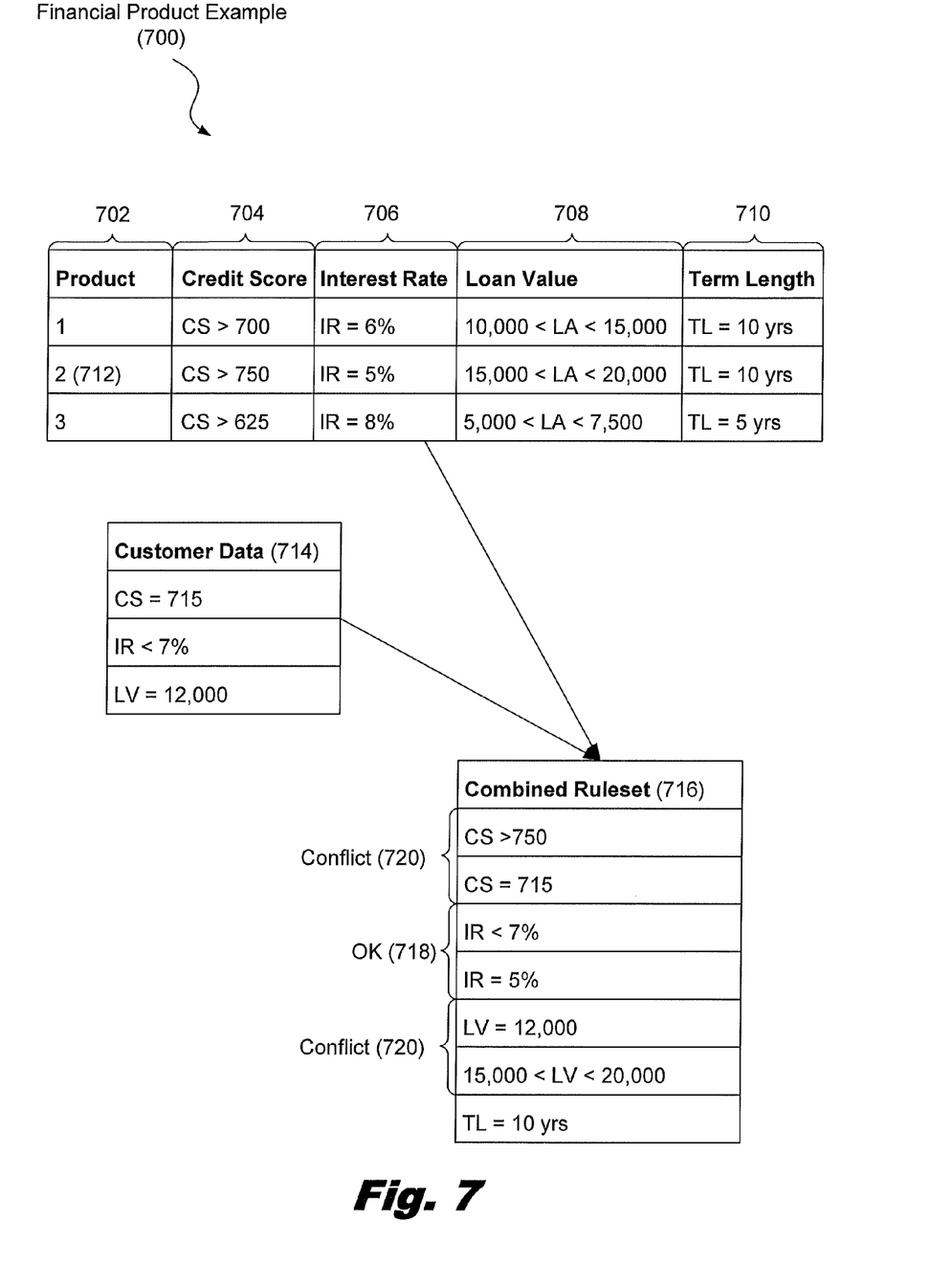
FIG. 7 is a diagram showing an example of a computing system finding an appropriate financial product for a customer, according to one embodiment of principles described herein.

FIG. 7 is a diagram showing a computing system finding an appropriate financial product for a customer. According to certain illustrative embodiments, a financial product (702) may be characterized by a credit score requirement (704), an interest rate (706), a loan amount (708), and a term length (710). The terms and conditions of a product may be combined with customer data (714) to form a union of rules (716).

A financial product may come with several terms and conditions which may be translated into a product ruleset. For example, product 2 (712) requires a credit score (704) greater than 750, has an interest rate (706) of 5%, is allowed a loan value (708) within the range of $15,000 to $20,000, and has a term length (710) of ten years.

The terms and conditions of product 2 (712) may be translated into a product ruleset and combined with a customer ruleset formed from a set of customer data (714). In the example shown in FIG. 7, the customer data indicates that the customer has a credit score of 715, is looking for a loan with an interest rate of less than 7%, and is looking for a loan value to $12,000.

The combined ruleset may contain rules from both the product ruleset and the customer ruleset. A logical reasoner is able to detect a conflict in the rules. For example, the loan requires a credit score greater than 750 but the customer data indicates the customer's credit score is 715. Because both of these statements cannot be true, the logical reasoner will return a conflict (720). The logical reasoner may also return a conflict because the loan value requested by the customer is outside the range specified by product 2 (712). Some ruleset combinations may be acceptable. For example, the rule specifying that the interest rate desired by the customer is less than 7% and the rule specifying that interest rate of product 2 (712) may both be true. Thus, this match will not cause the logical reasoner to return a conflict.

As there is at least one conflict with product 2 (712) it may be determined by the rule-based system that this product is not suitable for the customer. Thus, product 2 (712) will not be in the final list of products suitable for the user.

The example shown in FIG. 7 is a simplistic example designed for illustrative purposes. As will be appreciated by one skilled in the relevant art, a rule-based system may be capable of much more sophisticated logical inferences. For example, a customer may be interested in the behavior of a loan over a specified period of time. The rule-based system may be able to calculate loan behavior based on information about the loan. The nature of the calculated loan behaving may determine if the product in question is suitable for the customer.

Figure 8:
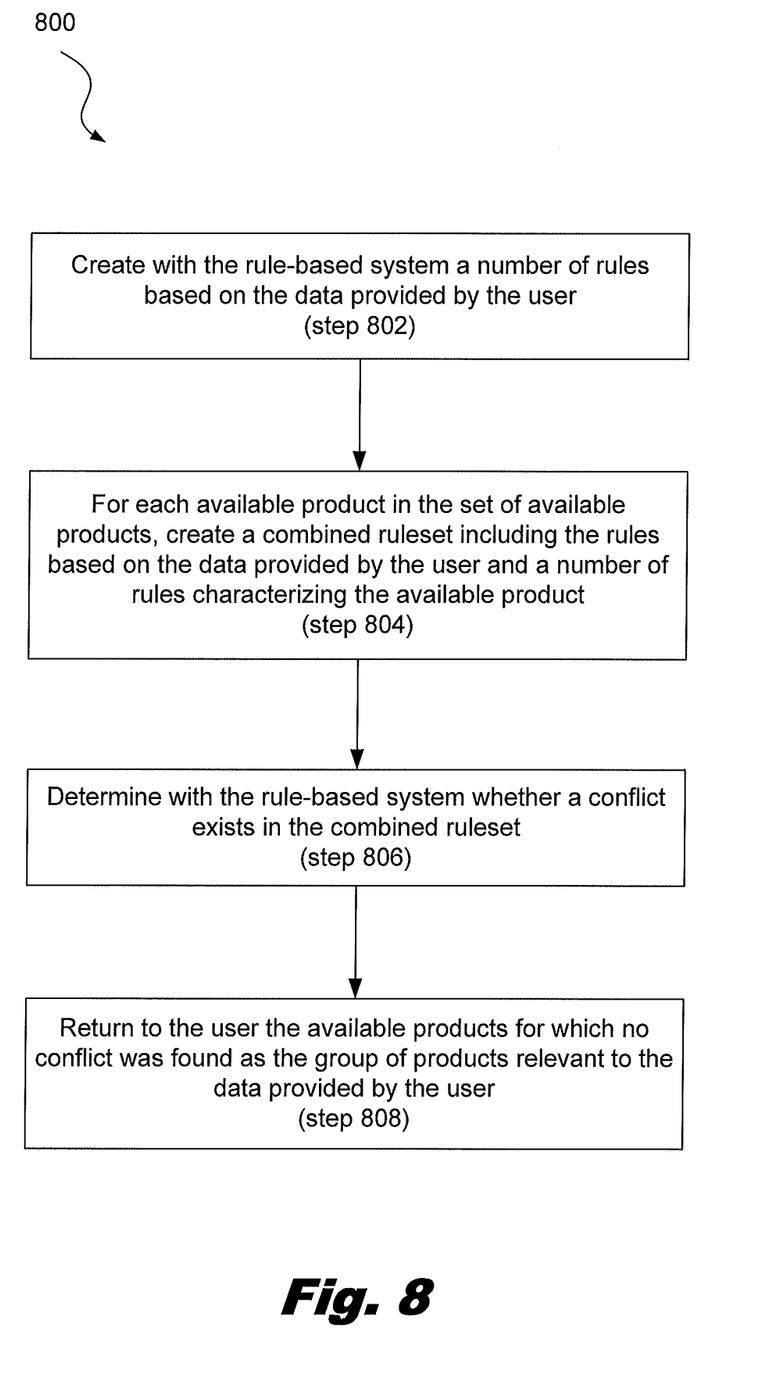
FIG. 8 is a flowchart showing an illustrative method for determining appropriate products for a customer, according to one embodiment of principles described herein.

FIG. 8 is a flowchart showing an illustrative method for determining appropriate products for a customer. According to certain embodiments, the method (800) may include creating (step 802) with the rule-based system a number of rules based on the data provided by the user, for each available product in the set of available products, creating (step 804) a combined ruleset including the rules based on the data provided by the user and a number of rules characterizing the available product and determining (step 806) with the rule-based system whether a conflict exists in the combined ruleset, and returning (step 808) to the user the available products for which no conflict was found as the group of products relevant to the data provided by the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for using a rule-based system implemented by at least one physical processor to identify from a set of available products a group of products relevant to data provided by a user, the method comprising:

creating with said rule-based system a number of rules based on said data provided by said user;

for each available product in said set of available products:
creating a combined ruleset comprising said rules based on said data provided by said user and a number of rules characterizing said available product; and
determining with said rule-based system whether a conflict exists in said combined ruleset; and
returning to said user said available products for which no conflict was found as said group of products relevant to said data provided by said user.

2. The method of claim 1, in which said determining with said rule-based system whether a conflict exists in said combined ruleset comprises determining whether any of said number of rules characterizing said available product combines with any of said number of rules based on said data provided by said user to create a logical inference for said rule-based system.

3. The method of claim 1, in which said combined ruleset further comprises a number of rules based on external conditions.

4. The method of claim 1, in which said number of rules based on said data provided by said user and said number of rules characterizing said product comprise description logic.

5. The method of claim 1, in which said creating said number of rules based on said data provided by said user comprises executing a translation function to translate a term or a condition provided by said user into a format able to be processed by a logical reasoner implemented in said rule-based system.

6. The method of claim 1, further comprising generating a subset of products from said set of available products by using a database query, said subset comprising products of a type specified by said query, in which said subset is used as said set of available products.

7. The method of claim 1, in which said products comprise financial products.

8. The method of claim 7, in which said rules characterizing said product represent financial terms and conditions of said product.

9. The method of claim 7, in which said rules based on data provided by said user represent information about said user.

10. The method of claim 7 in which said rules based on data provided by said user represent customer specifications for a desired financial product from said set of financial products.

11. A computing system comprising:
a processor; and
a memory communicatively coupled to said processor, said memory having stored thereon executable code configured to implement a rule-based logical reasoner when said executable code is executed by said processor;
in which said processor is configured to:
create a number of rules based on said data provided by said user;
for each available product in said set of available products:
create a combined ruleset comprising said rules based on said data provided by said user and a number of rules characterizing said available product; and
determine with said rule-based logical reasoner whether a conflict exists in said combined ruleset; and
return to said user said available products for which no conflict was found as said group of products relevant to said data provided by said user.

12. The computing system of claim 11, in which to determine whether a conflict exists in said combined ruleset, said processor is further configured to determine whether any of said number of rules characterizing said available product combines with any of said number of rules based on said data provided by said user to create a logical inference for said rule-based system.

13. The computing system of claim 11, in which said combined ruleset further comprises a number of rules based on external conditions.

14. The computing system of claim 11, in which said number of rules based on said data provided by said user and said number of rules characterizing said product comprise description logic.

15. The computing system of claim 11, in which said creating said number of rules based on said data provided by said user comprises executing a translation function to translate a term or a condition provided by said user into a format able to be processed by a logical reasoner implemented in said rule-based system.

16. The computing system of claim 11, in which said processor is further configured to generate a subset of products from said set of available products by using a database query, said subset comprising products of a type specified by said query, in which said subset is used as said set of available products.

17. The computing system of claim 11, in which said set of available products comprise financial products.

18. The computing system of claim 17, in which said rules characterizing said product represent financial terms and conditions of said product.

19. The computing system of claim 17, in which said rules based on data provided by said user represent at least one of: information about said user and user specifications for a desired one of said financial products.

20. A computer program product for determining an appropriate product for a customer, said computer program product comprising:
a computer readable storage medium having computer readable code embodied therewith, said computer readable program code comprising:
computer readable program code configured to create a number of rules based on said data provided by said user;
for each available product in said set of available products:
computer readable program code configured to create a combined ruleset comprising said rules based on said data provided by said user and a number of rules characterizing said available product; and
computer readable program code configured to determine whether a conflict exists in said combined ruleset; and
computer readable program code configured to return to said user said available products for which no conflict was found as said group of products relevant to said data provided by said user.

21. A method for using a rule-based system implemented by at least one physical processor to conduct a search to identify from a set of available products a group of products relevant to data provided by a user, the method comprising:
creating with said rule-based system a number of rules based on said data provided by said user, said data provided by said user being data describing a desired product for which a search is to be conducted among said set of available products;
for each available product in said set of available products:
creating a combined ruleset comprising said rules based on said data provided by said user and a number of rules characterizing said available product; and
determining with said rule-based system whether a conflict exists in said combined ruleset;

for each individual product for which no said conflict exists in said combined ruleset, identifying that product to be listed in search results to be returned to said user; and returning to said user said search results which indicate available products for which no conflict in said combined ruleset was found as said group of products relevant to said data provided by said user.

* * * * *